United States Patent [19]

Busujima

[11] Patent Number: 4,968,923
[45] Date of Patent: Nov. 6, 1990

[54] SERVO CONTROL SYSTEM

[75] Inventor: Akira Busujima, Hadano, Japan

[73] Assignee: Hitachi Seiko, Ltd., Ebina, Japan

[21] Appl. No.: 458,345

[22] Filed: Dec. 28, 1989

[30] Foreign Application Priority Data

Dec. 29, 1988 [JP] Japan .................. 63-333626

[51] Int. Cl.$^5$ ........................................... G05B 19/24
[52] U.S. Cl. .................... 318/560; 318/561; 318/618; 318/632
[58] Field of Search ................ 318/560–646

[56] References Cited

U.S. PATENT DOCUMENTS

| | | | |
|---|---|---|---|
| 4,331,910 | 5/1982 | Kohzai et al. | 318/618 |
| 4,341,986 | 7/1982 | Browder | 318/618 |
| 4,345,194 | 8/1982 | Green | 318/618 X |
| 4,353,020 | 10/1982 | Veale | 318/601 |
| 4,535,277 | 8/1985 | Kurakake | 318/561 |
| 4,707,780 | 11/1987 | Gose et al. | 318/632 X |
| 4,814,680 | 3/1989 | Hulsing | 318/632 X |
| 4,859,920 | 8/1989 | Kurakake et al. | 318/569 X |
| 4,882,528 | 11/1989 | Sogabe et al. | 318/574 X |

Primary Examiner—William M. Shoop, Jr.
Assistant Examiner—Paul Ip
Attorney, Agent, or Firm—Wegner & Bretschneider

[57] ABSTRACT

A servo control system has a motor for a control and a device for commanding target distance and velocity of movement of the control so as to actuate the motor in accordance with commands from the commanding device. The system further includes a distribution device for determining a set of distances of movement for a set of like number of unit times respectively on the basis of the target distance and velocity of movement; a device for adding predetermined numbers of unit times, in each of which the distance of movement is set at zero, before and after the set of the like number of the unit times, respectively; a device for setting a set of weights for the positions of movement for the like number of unit times, respectively; and an averaging device for successively adding the weights to the positions of movement for the like number of unit times, respectively, and averaging the resulting weighted position of movement of a first unit time and those of a desired number of preceding successive unit times to calculate a target position for the first unit time, and then repeating a similar averaging operation successively with respect to each of the remaining unit times in the order of sequence of the remaining unit times until a target position for a last time unit is calculated.

2 Claims, 9 Drawing Sheets

| TIME | DISTRIBUTED X-AXIS DATA | X-AXIS TARGET POSITION | X-AXIS POSITION COMMAND | DISTRIBUTED Y-AXIS DATA | Y-AXIS TARGET POSITION | Y-AXIS POSITION COMMAND |
|---|---|---|---|---|---|---|
| 1 | 18 | 18 | 4 | 47 | 47 | 9 |
| 2 | 17 | 35 | 11 | 47 | 94 | 28 |
| 3 | 18 | 53 | 21 | 46 | 140 | 56 |
| 4 | 17 | 70 | 35 | 47 | 187 | 94 |
| 5 | 18 | 88 | 53 | 47 | 234 | 140 |
| 6 | 14 | 102 | 70 | 48 | 282 | 187 |
| 7 | 14 | 116 | 86 | 48 | 330 | 235 |
| 8 | 14 | 130 | 101 | 48 | 378 | 282 |
| 9 | 14 | 144 | 116 | 48 | 426 | 330 |
| 10 | 14 | 158 | 130 | 48 | 474 | 378 |
| 11 | 0 | 158 | 141 | 0 | 474 | 416 |
| 12 | 0 | 158 | 150 | 0 | 474 | 445 |
| 13 | 0 | 158 | 155 | 0 | 474 | 464 |
| 14 | 0 | 158 | 158 | 0 | 474 | 474 |
| 15 | 0 | 158 | 158 | 0 | 474 | 474 |

SERVO CONTROL SYSTEM

BACKGROUND OF THE INVENTION (a) Field of the Invention:

The present invention relates to a servo control system for precisely moving an object, which is to be controlled and will hereinafter be called a "control", to a target position.

(b) Description of the Related Art:

Servo control systems have found utility in many fields such as automatic drafting machines, machine tools and robot-assisted controls. One example of these servo control systems will next be described in brief with reference to drawings.

Figure 1:
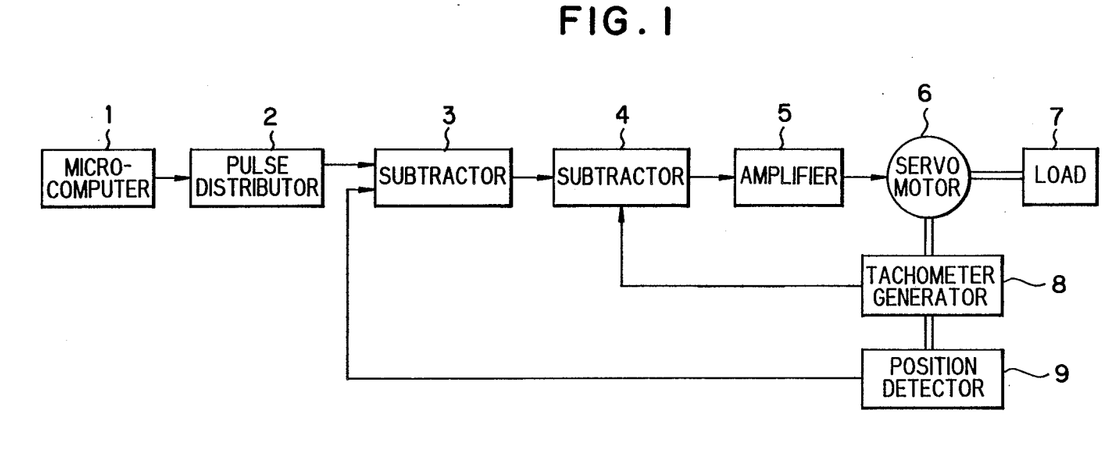
FIG. 1 is a block diagram of a conventional servo control system.
Figure 2:
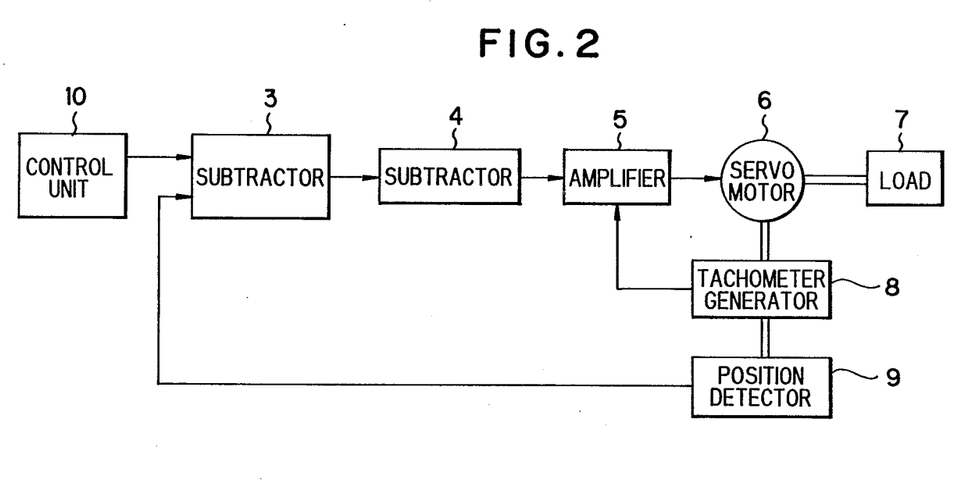
FIG. 2 is a block diagram of a servo control system according to a first embodiment of the invention.

FIG. 1 is a block diagram of a conventional servo control system, in which numeral 1 indicates a microcomputer for commanding and outputting target distance and velocity of movement for a control. Designated at numeral 2 is a pulse distributor which generates pulses corresponding to the target distance of movement outputted from the microcomputer 1. Here, the frequency of these pulses is converted in accordance with the target velocity commanded. A subtractor is indicated at numeral 3 and serves to output a signal indicative of the difference in phase between the pulses from the pulse distributor 2 and a phase signal corresponding to a current position of the control and outputted from a position detector 9 to be described subsequently. There are also illustrated another subtractor 4 for computing the difference between a phase difference signal from the subtractor 3 and a rotational speed signal from a tachometer generator 8 to be described subsequently, and an amplifier 5 for amplifying a difference signal from the subtractor 4. Designated at numeral 6 is a servomotor which is driven at a rotational speed always kept in conformity with each velocity command in accordance with a signal from the amplifier. Numeral 7 indicates a load connected to the servomotor 6, namely, the control. In the case of an automatic drafting machine for example, the load 7 may be a head which carries a writing instrument and moves on a sheet of recording paper. There is also shown the tachometer generator 8 connected to the servomotor 6. The tachometer generator 8 outputs as a signal a current rotational speed of the servomotor 6. The position detector 9 is connected to the servomotor 6 and outputs data on a current position of the load 7.

Owing to such a construction, the control is caused to move to a target position at a velocity conforming with a value commanded.

In the above-described conventional servo control system, the control of velocity has been performed by generating pulses at the pulse distributor 2 and then converting them into pulses of a frequency conforming with a commanded value of velocity. In other words, the pulse distributor 2 has been constructed to produce outputs at intervals conforming with a given velocity. To obtain such outputs, the pulse distributor 2 must have a broadband conversion function for pulse frequencies, resulting in the problem that the circuit construction of the pulse distributor 2 inevitably becomes extremely complex and large.

With the conventional servo control system, the acceleration changes considerably so that impacts and vibrations are exerted to an associated machine. They in turn cause loosening of screws, separation of bonded parts, etc., whereby the service life and accuracy of the machine are reduced. Moreover, vibrations in the course of movement tend to lead to inconvenience, for example, such that desired line segments cannot be drawn precisely in the case of an automatic drafting machine or desired cutting cannot be conducted in the case of a machine tool. A pulse frequency determination system is required as a countermeasure for the inconvenience, thereby making the servo control system complex and expensive.

SUMMARY OF THE INVENTION

An object of this invention is to provide a servo control system which can solve the above-described problems of the conventional technology, has a simple construction, can produce a velocity pattern suited for a machine as a control and can significantly reduce impacts and vibrations.

In a first aspect of this invention, there is thus provided a servo control system having a means for driving a control and a means for commanding target distance and velocity of movement of the control so as to actuate the drive means in accordance with commands from the command means, comprising:

a target position computing means for determining a set of individual target distances of movement for a set of a like number of unit times respectively on the basis of the target distance and velocity of movement; and an averaging means for arranging, before the set of the like number of the unit times, a predetermined number of unit times in each of which the distance of movement is set at zero and averaging target position of movement of a first unit time and those of a desired number of preceding successive unit times to calculate a target position for the first unit time, and then repeating a similar averaging operation successively with respect to each of the remaining unit times in the order of sequence of the remaining unit times until a target position for a last time unit is calculated, whereby actuation of the drive means is controlled based on values obtained by the averaging means.

In a second aspect of this invention, there is also provided a servo control system having a means for driving a control and a means for commanding target distance and velocity of movement of the control so as to actuate the drive means in accordance with commands from the command means, comprising:

a distribution means for determining a set of distances of movement for a set of like number of unit times respectively on the basis of the target distance and velocity of movement;

a means for adding predetermined numbers of unit times, in each of which the distance of movement is set at zero, before and after the set of the like number of the unit times, respectively;

a means for setting a set of weights for the positions of movement for the like number of unit times, respectively; and an averaging means for successively adding the weights to the positions of movement for the like number of unit times, respectively, and averaging the resulting weighted position of movement of a first unit time and those of a desired number of preceding successive unit times to calculate a target position for the first unit time, and then repeating a similar averaging operation successively with respect to each of the remaining unit times in the order of sequence of the remaining unit times until a target position for a last time unit is calculated, whereby actuation of the drive means is controlled based on values obtained by the averaging means.

According to the first aspect of the invention, when target distance and velocity of movement are given by the command means, individual target distances of movement (distributed data) are determined for respective unit times on the basis of these values. These distributed data are successively cumulated to determine a set of target positions of movement for the respective unit times. Next, a predetermined number of unit times in each of which the distance of movement is set at zero are added as a group before the set of unit times to prepare a new set of unit times. From the new set of unit times, a first unit time and those of a desired number of preceding successive unit times are taken out and an average of their target positions of movement is computed. This operation is performed successively from one unit time to the next unit time over the entire unit times. As a result, a set of position commands to be commanded to the drive means is obtained. These position commands are outputted to the drive means in the order of their sequence in the set. By the position commands, a control is successively driven at appropriate velocities. It is therefore possible to perform a servo control without using a pulse distributor, so that the overall construction can be simplified. It is also possible to reduce impacts and vibrations of an associated machine.

According to the second aspect of the invention, when target distance and velocity of movement are given by the command means, distances of movement for individual unit times are first determined from both the target distance and the target velocity. The unit times are arranged as a set. Predetermined numbers of unit times, in each of which the distance of movement is set at zero, are added before and after the set of the unit times. On the other hand, the weight-setting means sets a set of weights by arranging a like number of weights of desired values in a prescribed order. Next, the weights are added to the distances of the individual unit times successively from a first unit time in the whole unit times including the unit times in each of which the distance of movement is set at zero. The addition of these weights is performed by making the distances of movement in the order of the respective unit times correspond to the set of the weights. The thus-weighted individual distances of movement are all added, and the sum is divided (averaged) by the sum of the weights. Such a weighting operation is performed over the entire unit times while shifting from one unit time to the next unit time. A distance of movement, namely, a velocity command is computed for each unit time as described above, so that an appropriate velocity pattern is created. Under a control based on the velocity pattern, the drive means is actuated. It is hence possible to simplify the construction of a servo control system. It is also feasible to obtain a velocity pattern conforming with the characteristics of an associated machine, thereby making it possible to substantially reduce impacts and vibrations of the machine.

BRIEF DESCRIPTION OF THE DRAWINGS

The above and other objects, features and advantages of the present invention will become apparent from the following description and the appended claims, taken in conjunction with the appended drawings, in which:

FIG. 10 and FIG. 11 diagrammatically depict velocity patterns. DETAILED DESCRIPTION OF THE INVENTION AND PREFERRED EMBODIMENTS Referring first to FIG. 2, the servo control system according to the first embodiment of the invention will be described. In FIG. 2, like parts to those shown in FIG. 1 are indicated by like reference numerals and their description is omitted herein. Numeral 10 indicates a control unit which is constructed of a microcomputer. In the present embodiment, the functions of the microcomputer 1 and the pulse distributor 2 in the system shown in FIG. 1 are performed by the control unit 10.

Figure 3:
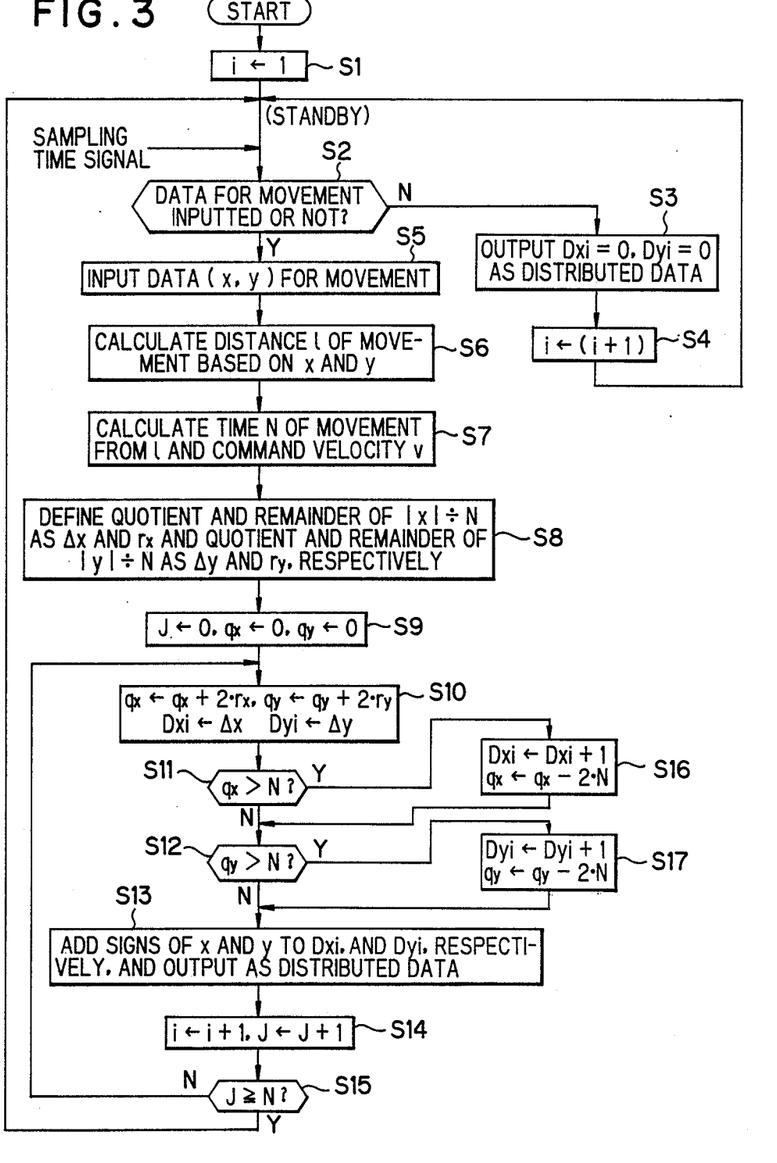
FIG. 3 and FIG. 5 are flow charts describing the operation of the system depicted in FIG. 1.
Figure 4A:
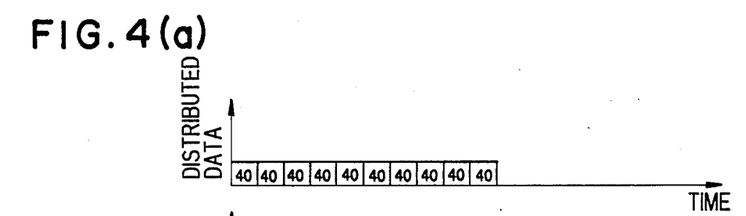
FIG. 4(a), 4(b), 4(c) and 4(d) diagrammatically illustrate an averaging means of the system illustrated in FIG. 2.
Figure 4B:
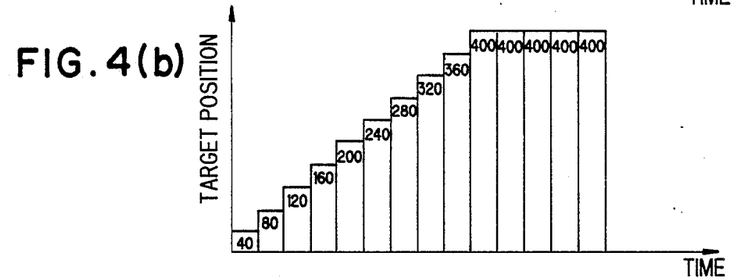
Figure 4C:
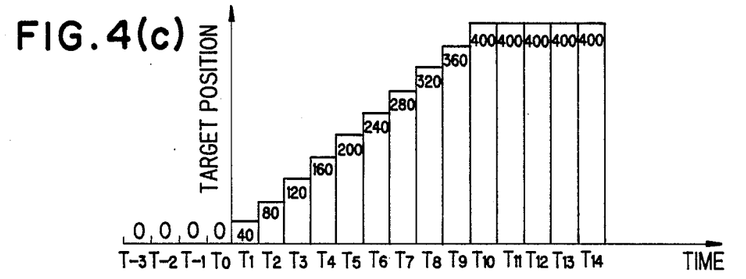

The operation of the control unit 10 will next be described with reference to the flow charts of FIGS. 3 and 5 and the graphs of FIGS. 4(a) through 4(d). To facilitate the understanding, a description will now be made of a specific example in which a command that a load 7 be moved at a velocity of 50 mm/sec from the origin A to a point B (400,300) has been inputted. Upon input of such a command to the control unit 10, the control unit 10 computes distributed data for X-axis and Y-axis on the basis of these values. The term "distributed data" as used herein means data on distances of movement outputted for respective unit times.

The distributed data $D_x$ for X-axis and the distributed data $D_y$ for Y-axis can be expressed by the following formulae, respectively:

$$D_x = \frac{x}{N} = \frac{x}{\frac{l}{v}} = \frac{x}{\frac{\sqrt{x^2+y^2}}{v}} \quad (1)$$

$$D_y = \frac{y}{N} = \frac{y}{\frac{l}{v}} = \frac{y}{\frac{\sqrt{x^2+y^2}}{v}} \quad (2)$$

where x: target distance in the direction of X-axis;
y: target distance in the direction of Y-axis;
l: distance between the origin A and the point B;
v: commanded velocity; and
N: moving time.

Since x=400, y=300 and v=50 in the above example, N=10, $D_x$=40 and $D_y$=30. Namely, the distributed data are distances $D_x$(40) for the N (10) unit times, respectively. Of these distributed data, those for X-axis are illustrated in FIG. 4(a). Namely, the distributed data are each 40 for each unit time.

In many instances, distributed data (x/N,y/N) do not take integers unlike the above example. In the present embodiment, distributed data are thus obtained through processings which are to be described hereinafter with reference to the flow chart depicted in FIG. 3.

In these processings, individual distances of movement for respective unit times, namely, distributed data are represented by $D_{xi}$ for X-axis and $D_{yi}$ for Y-axis. The suffix "i" indicates the number of each unit time. Accordingly, upon distribution processing, the suffix "i" is first set at 1 (Step $S_1$ shown in FIG. 3). The routine remains on standby until one unit time elapses before advancing to the next Step $S_2$. After the lapse of the time, a judgment is made on whether there are data for movement (target positions) inputted as movement commands in the control unit 10 (Step $S_2$). When there are no data for movement, distributed data $D_{xi}$ and $D_{yi}$ are each outputted as 0 (Step $S_3$) and 1 is added to the suffix "i". After the lapse of one unit time, Step S2 is performed again.

When data for movement are found to exist in Step $S_2$, the data for movement, namely, a distance x in the direction of X-axis and a distance y in the direction of Y-axis are inputted (Step $S_5$) and the moving distance l ($l=\sqrt{x^2+y^2}$) is computed (Step $S_6$). Next, from the thus-computed moving distance l and a moving velocity v inputted as a command to the control unit 10, a moving time N (the number of unit times) is computed (Step $S_7$). Incidentally, the above moving velocity v (50 mm/sec in the preceding example) has been set in advance in accordance with the performance of an associated machine, an attachment (for example, what kind of writing instrument is used in the case of an automatic drafting machine), etc. The moving time N is determined by l/v but seldom becomes an integer as described above. Therefore, any fraction of the moving time N determined in the step $S_7$ is rounded up. The subsequent steps $S_8$–$S_{17}$ are performed to determine distributed data when the distance of movement during each unit is not an integer.

Where the distance of movement per unit time is not an integer, it is necessary to minimize differences among distributed data for the respective unit times as much as possible and also to average the distributed data over the entire moving time N. For this purpose, the subsequent processings are therefore performed to either increase or decrease by a smallest value the distributed data for each unit time. To conduct these processings, there are inputted a number J indicating the number of outputs of distributed data and numbers $q_x,q_y$ showing an increase or decrease of the preceding distributed datum. Actually, these numbers J,$q_x$,$q_y$ are values stored at desired addresses of a memory.

A description will hereinafter be made using simplest values with respect to X-axis by way of example. Let's now assume that x and N are 10 and 4, respectively (x=10, N=4). Then, the following processing is performed in Step $S_8$. Namely, the absolute value of the distance x is divided by the moving time N to obtain a quotient and a remainder as $\Delta x$ and $r_x$, respectively. By this processing, $\Delta x=2$ and $r_x=2$ are obtained from the above exemplified values. Next, the routine advances to Step $S_9$ in which J and $q_x$ are each set at 0. In Step $S_{10}$, a new number $q_x$ is determined by computing ($q_x+2\cdot r_x$) and the distributed datum $D_{xi}$ is set at $\Delta x$. In the case of the above example, the new number $q_x$ is (0+2×2), i.e., a value of 4 and the distributed datum $D_{xi}$ becomes a value of 2.

Next, the value $q_x$ and the moving time N are compared with each other (Step $S_{11}$). Since $q_x=4$ and N=4 in the above example, $q_x>N$ does not exist and the routine thus advances to Step $S_{12}$. After a similar processing is also performed with respect to Y-axis, the routine advances to Step $S_{13}$. In Step $S_{13}$, a symbol indicative of the direction of X-axis is added to the distributed datum $D_{xi}(=2)$ determined in Step $S_{10}$, and the resultant datum is outputted as a distributed datum. Next, the number i is added with 1 and the number of J is also added with 1 (Step $S_{14}$). This new number J is compared with the moving time N (Step $S_{15}$). If the number J has not reached the moving time N, the routine again returns to Step $S_{10}$. Since the number $q_x$ has become 4 ($q_x=4$) by the previous Step $S_{10}$, the new number $q_x$ becomes 8(4+2×2). On the other hand, the distributed datum is represented by $D_{x(i+1)}$, $D_{x(i+1)}=\Delta x=2$.

Since $q_x=8$ and N=4, it is judged $q_x>N$ in Step $S_{11}$ and the routine advances to Step $S_{16}$. In Step $S_{16}$, 1 is added to $D_{x(i+1)}=2$ to make the distributed datum $D_{x(i+1)}$ equal to 3. Further, as a new number $q_x$, $q_x-2\times N=8-2\times 4=0$ is given. After similar processings (Steps $S_{12}$ and $S_{17}$) are also performed with respect to Y-axis, the above distributed datum $D_{x(i+1)}$ is added with a symbol indicative of the direction of Y-axis and is then outputted in Step $S_{13}$. Similar procedures are repeated thereafter. As a result, the distributed data $D_{xi}$ for X-axis become "3", "2", "3" and "2". The subsequent processings beginning at Step $S_9$ are also performed for Y-axis.

Distributed data are outputted successively by the above-described processings. FIG. 4(a) shows a set of distributed X-axis data, which have been obtained in the manner described above. It is however to be noted that the distributed data depicted in FIG. 4(a) are those obtained under the above exemplified conditions of N=10, and $D_x=40$. In the figure, time is plotted along the axis of abscissas while the distributed data are plotted along the axis of coordinates. It is appreciated that the distance of movement per unit time is 40.

At the control unit 10, the following averaging processing is applied to the distributed X-axis data which have been obtained by such distribution processings and are illustrated in FIG. 4(a). The averaging processing will hereinafter be described with reference to the graphs shown in FIGS. 4(b), 4(c) and 4(d), respectively. First of all, X-axis target positions for the respective time units are determined on the basis of the distributed data. Because the distributed data indicate the distances of movement, target positions can be obtained by successively cumulating the distributed data. A set of target positions are depicted in FIG. 4(b). The first target position is at 40, while the final target position is at 400. Next, before the set of unit times, four unit times in each of which the distance of movement is set at 0 are inserted as illustrated in FIG. 4(c). Thereafter, an average target position (40/5) of the five unit times of from $T_{-3}$ to $T_1$ is computed to obtain an average target position (position command) of 8. Next, the average of the target positions of the unit times of from $T_{-2}$ to $T_2$ {(40+80)/5} is computed to obtain a position command of 24. By repeating such an operation, averaged position commands as shown in FIG. 4(d) are outputted from the control unit 10 to the subtractor 3.

Figure 4D:
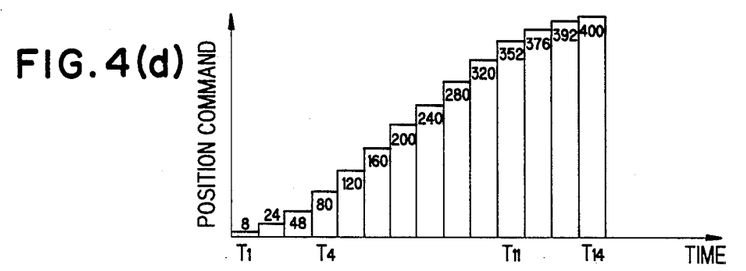
Figure 5:
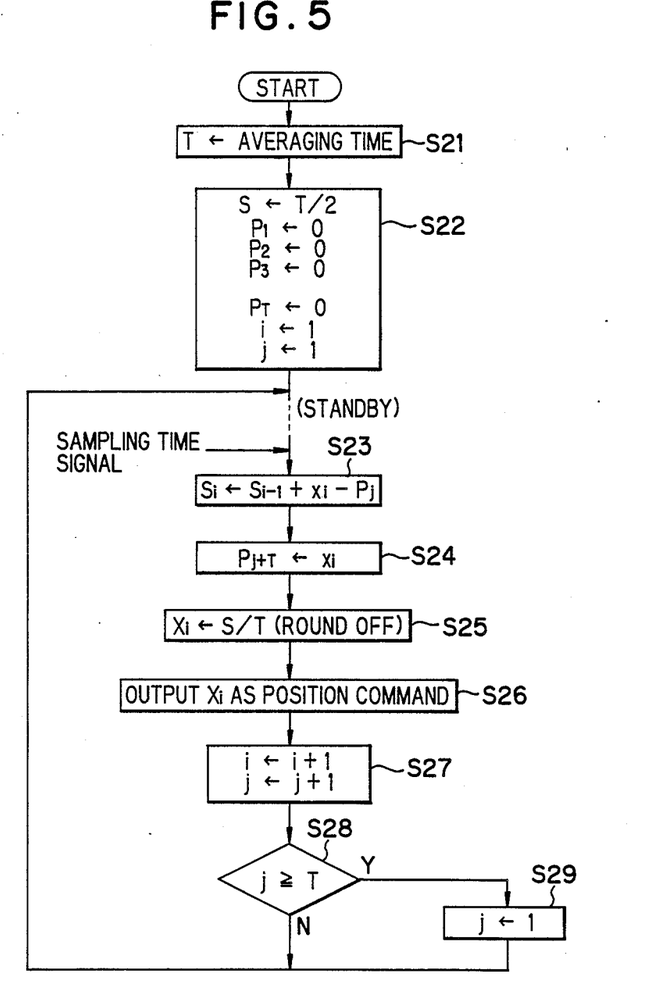

It is readily envisaged from FIG. 4(d) that the distance increment to a target position is reduced during acceleration (the unit times $T_1-T_4$) and also during deceleration (the unit times $T_{11}-T_{14}$) As a result, impacts and vibrations are also reduced.

In addition, position commands for Y-axis can also be obtained in exactly the same manner. Distributed data, target positions and position commands for Y-axis in the above specific example are tabulated below:

| Time | Distributed data | Target position | Position command |
|------|------------------|-----------------|------------------|
| 1    | 30               | 30              | 6                |
| 2    | 30               | 60              | 18               |
| 3    | 30               | 90              | 36               |
| 4    | 30               | 120             | 60               |
| 5    | 30               | 150             | 90               |
| 6    | 30               | 180             | 120              |
| 7    | 30               | 210             | 150              |
| 8    | 30               | 240             | 180              |
| 9    | 30               | 270             | 210              |
| 10   | 30               | 300             | 240              |
| 11   | 0                | 300             | 264              |
| 12   | 0                | 300             | 282              |
| 13   | 0                | 300             | 294              |
| 14   | 0                | 300             | 300              |

Similarly to the distributed data, the averaged values computed by the averaging processing for the determination of the above position commands are not integers in many instances. Therefore, the operation for computing the position commands at the control unit 10 will hereinafter be described with reference to the flow chart shown in FIG. 5. A number T (T=5 in the preceding example) is firstly set as an averaging time (Step $S_{21}$ in FIG. 5). The cumulated value during the averaging time is then assumed to be S. The cumulated value S is determined in accordance with the following formula:

$$S = \sum_{k=i-T+1}^{i} x_k \quad (1)$$

where
i: time; and
$x_i$: target position, i.e., target distance of movement.
Assuming now i=1, the formula (1) can be rewritten as follows:

$$S = \sum_{k=-3}^{i} x_k = x_{-3} + x_{-2} + x_{-1} + x_0 + x_1 \quad (2)$$

In the preceding example, the target positions $x_{-3}$, $x_{-2}$, $x_{-1}$ and $x_0$ are 0 while the target position $x_1$ has the value of 40. Further, let's represent the values of target positions stored at prescribed addresses in the memory of the control unit 10 by $P_1-P_T$ and the number of averaging operations by j, respectively. Let's also adopt the following settings: S=T/2, $P_1=0$, $P_2=0$, ..., $P_T=0$, i=1 and j=1 (Step $S_{22}$). The setting of S=T/2 will be described subsequently.

After the routine is maintained at standby until one unit time lapses (i.e., a signal indicative of a sampling time is inputted) before the routine advances to Step $S_{23}$, the cumulated value S is computed (Step $S_{23}$). This cumulated value S can be represented by the following formula:
S=(T/2)+$x_1$−0.
Here, the preset value S=T/2 is used to set the cumulated value S at 0.5T as an initial value in the stopped state at the beginning. The addition of the value T/2 is to round off any decimal fractions in the averaging processing to be described subsequently. Next, the value $P_1$ is set at $x_1$ (Step $S_{25}$) and the computation of the position command $X_i$ is carried out (Step $S_{25}$). The first position command $X_1$ is expressed by the following formula:

$$X_1 = \frac{x_1}{T} + \frac{T/2}{T} = \frac{x_1}{T} + 0.5$$

Any decimal fractions of the above computation are rounded off and the position command $X_1$ are outputted as an integer from the control unit 10 (Step $S_{26}$). At this time point, actuation of the drive means is started. Even when decimal fractions are rounded off as described above, errors due to fractions so rounded off will not accumulate because the above averaging is the averaging of target positions. Next, the values i and j are each added with a number of 1 (Step $S_{27}$), resulting in i=2 and j=2. A comparison is next made between j and T (j>T) to judge whether the averaging has been performed T times, in other words, whether the substitution of the target position $x_i$ for the values $P_1-P_5$, said substitution having been performed in Step $S_{24}$, has been completed through (Step $S_{28}$). Unless the substitution has been found completed, the routine returns to Step $S_{23}$ again.

The above Steps $S_{23}-S_{28}$ are repeated. When the values $P_1 - P_5$ have been replaced by the target positions $x_1-x_5$ (40−200) in the preceding example, (j =T) is judged in Step $S_{28}$ so that the value j is reset to the value 1 (Step $S_{29}$). Therefore, in the next Step $S_{23}$, a new cumulated value S is computed as follows:

S={(T/2)+$x_1+x_2+x_3+x_4+x_5+x_6-x_1$}

In the above formula, (T/2) - $x_5$ are the previous cumulated value S. The averaging is performed in the abovedescribed manner, whereby position commands $X_i$ are outputted successively.

In the above example, the control was caused to move linearly. A description will next be made of another example in which an object is caused to undergo a curvilinear movement. When an object is caused to move along a curve, the curve is generally shown as a continuation of divided short line segments. Hence, the following example will be described based on two continuous short line segments which make up parts of a straight line.

Figure 6:
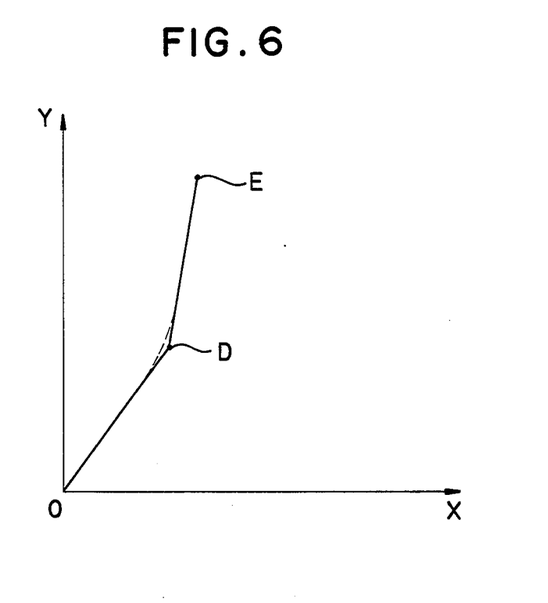
FIG. 6 is a graph showing two line segments.

FIG. 6 is a graph of two short line segments OD and DE. The coordinates of the point D are (88,234), while those of the point E are (158,474). Accordingly, the lengths of the short line segments OD and DE are both 250mm.

Figure 7:
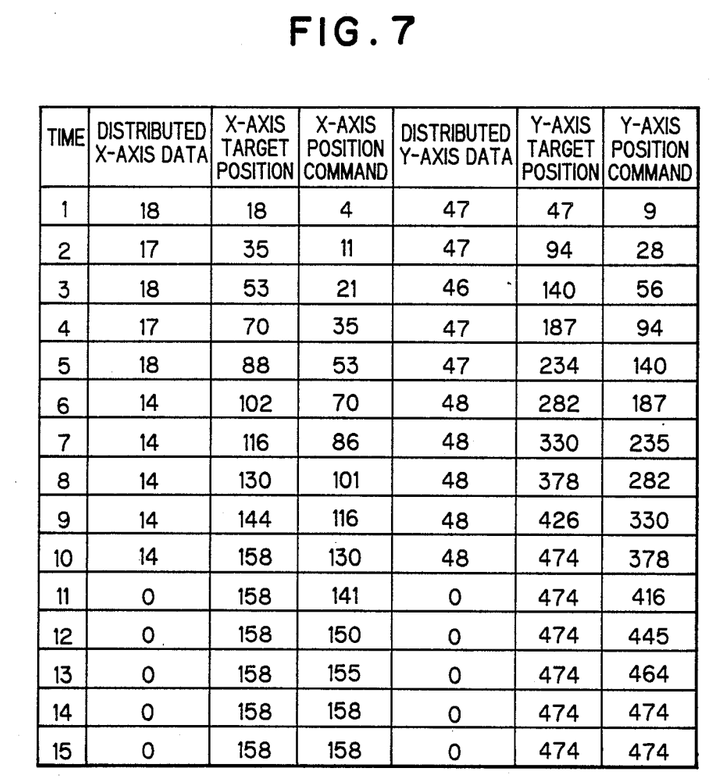
FIG. 7 is a table showing data of an averaging processing for the line segments of FIG. 6.

It should be noted that the respective line segments are drawn with the bending at the point D exaggerated with a view toward facilitating the understanding. Setting the target velocity at 50 mm/sec, let's conduct distribution and averaging with respect to both X-axis and Y-axis in a similar manner to the preceding example of linear movement. Distributed data, target positions and position commands for each axis take such values as shown in FIG. 7. Eventually, in the vicinity of the point D as a center, a smooth and gentle curve is obtained as indicated by a dashed lines in FIG. 6.

Since the distance of movement of the two short line segments are continuously averaged as described above, the change in velocity at the boundary of both the short line segments becomes gentle, whereby angular portions of the curve are eliminated to make it possible to draw a track approximating a still more desired curve.

In the above example, a part of a curve is shown by two short line segments. In some instances, two line segments which are continuous but do not form a straight line have to be shown exactly as they are. In these instances, the boundary of these two line segments, namely, an angular portion has to be reproduced exactly. This can be achieved by outputting a same position command at the boundary between the region of the line segment OD and that of the line segment DE to set the velocity at 0 at the point D. This allows to draw tracks of two distinct line segments.

In view of the foregoing, it is also possible to control the smoothness of the curve at the point D by adjust the position command at the boundary between the region of the line segment OD and that of the line segment.

As has been described above, in the present embodiment, a linear distance of movement is determined based on a target distance in the direction of X-axis and the target distance in the direction of Y-axis. Further, a moving time is determined based on the linear distance and a commanded velocity. Further, the target distances along the respective axes are divided by the moving time so that distributed data for the respective axes are calculated on the basis of the corresponding quotients and remainders. Target positions for the individual unit times along both the axes are then determined from the corresponding distributed data obtained above. Averaging processing is then applied to the target positions to obtain position commands. A drive means is then actuated by the position commands. It is hence possible to perform a servo control without the need for a pulse distributor, thereby making it possible to simplify the overall construction. It is also possible to easily reduce impacts and vibrations and further to smoothen the track of a curve.

In the above description of the embodiment, the desired number of unit times in which the target distance of movement was set at 0 were placed. It is however not essential that this target distance of movement is 0. Values close to 0 can also be used. It is also apparent that the servo control mechanism can be applied to multiaxes controls along three or more axes.

Figure 8:
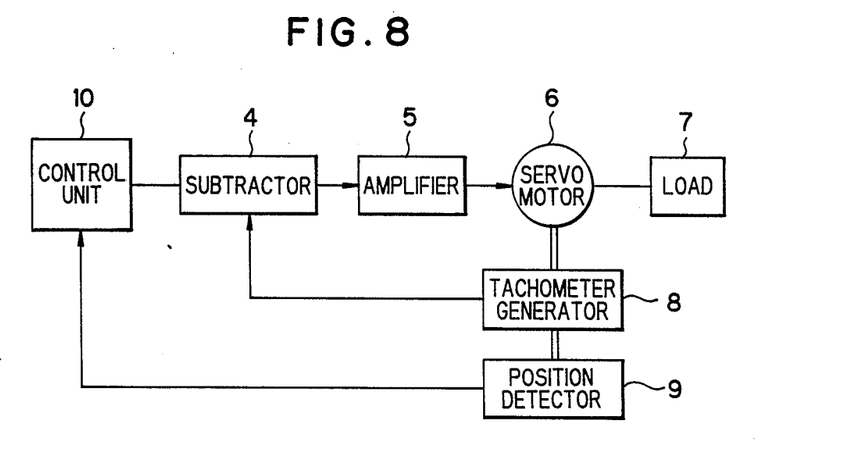
FIG. 8 is a block diagram of a servo control system according to a second embodiment of the invention.

Referring next to FIG. 8, the servo control mechanism according to the second embodiment of the invention will be described. In FIG. 8, like parts to those shown in FIG. 1 are indicated by like reference numerals and their description is omitted herein. Numeral 10 indicates a control unit which is constructed of a microcomputer. In the present embodiment, the functions of the microcomputer 1, the pulse distributor 2 and the subtractor 3 in the system shown in FIG. 1 are performed by the control unit 10.

The operation of the control unit 10 will next be described with reference to the graphs shown in FIGS. 9(a) through 9(e). Based on inputted values, the control unit 10 computes distributed data for X-axis and Y-axis in accordance with the formulae (1) and (2) described above.

To facilitate the understanding, a description will now be made of a specific example in which commands that the target distance of movement is 600 mm in the direction of X-axis and the commanded velocity is 60 mm/sec have been inputted. Since x=600, y=0 and v=60 in the above formulae (1) and (2), N=10, $D_x$=60 and $D_y$=0. Namely, the distributed data are each the distance of movement $D_x$(60) for each of the N (10) unit times.

Figure 9A:
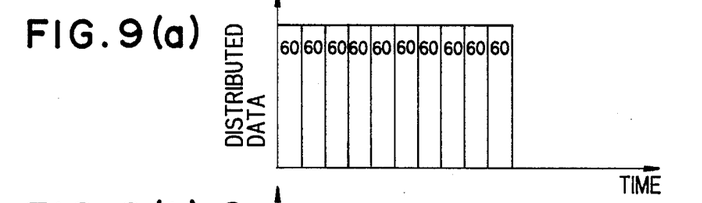
FIG. 9(a), 9(b), 9(c), 9(d) and 9(e) diagrammatically illustrate the process of formation of a velocity pattern.
Figure 9B:
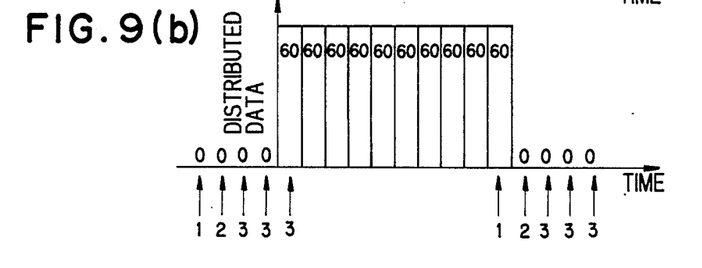

FIG. 9(a) indicates the above-described set of distributed data, where N=10 and $D_x$=60. In the figure, time is plotted along the axis of abscissas while distributed data are plotted along the axis of coordinates. It is appreciated that a moving distance of 60 is outputted ten times, one per every unit time. To the distributed data obtained by such a distribution processing and illustrated in FIG. 9(a), desired numbers of unit times in which the distance of movement is 0 are added. This is depicted in the graph of FIG. 9(b). Namely, two sets of four unit times in which the distance of movement is 0 are added, one before the distributed data and the other after the distributed data.

By the addition of the two sets of four unit times, the total number of the unit times has become 18. Here, a processing is performed to add predetermined weights d to these unit times respectively and then to successively calculate velocity commands beginning for the first unit time. In the present embodiment, the weights d are set as follows:

$d_1$=1, $d_2$=2, $d_3$=3, $d_4$=3, and $d_5$=3.

These weights are determined as a set in view of characteristics (vibration characteristics, acceleration and deceleration characteristics, etc.) of an associated machine as a control so that a velocity pattern suited for these characteristics can be created. As shown on a left-hand end part of FIG. 9(b), the set of the above weights is rendered correspond successively to the unit times, beginning at the first unit time in the order of sequence of the weights. The number of unit times, in which the distance of movement is set at O, added at the other end is smaller by 1 than the number of the weights (5 in the present embodiment), namely, is 4 in the present embodiment. Accordingly, velocity command values $X_i$ can be expressed by the following formula:

$$X_i = \frac{1}{S} \sum_{k=1}^{5} d_k \cdot x_{(k+1)} \tag{3}$$

where $X_i$: velocity command values;
i: numbers of the corresponding unit times of the velocity command values (beginning at 0);
S: total of weights;
k: number of weights; and
x: distributed data.

Let's now determine the velocity command value for the first (0th) unit time in accordance with the formula (3):

$$\frac{(0 \times 1) + (0 \times 2) + (0 \times 3) + (0 \times 3) + (60 \times 3)}{1 + 2 + 3 + 3 + 3} = 15$$

Figure 9C:
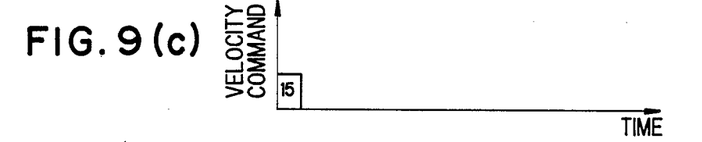

This velocity command value "15" is shown in FIG. 9(c).

Figure 9D:
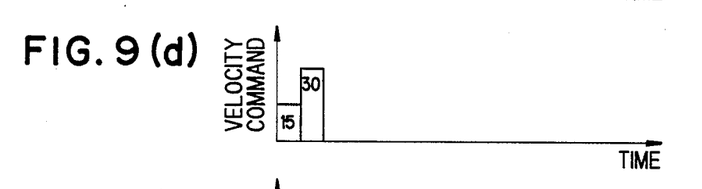
Figure 9E:
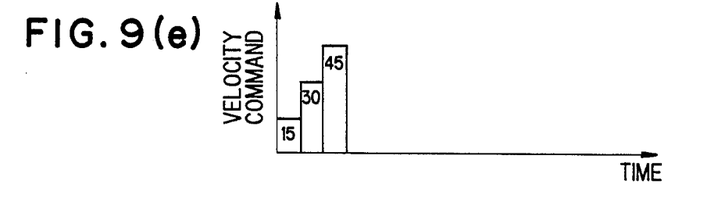
Figure 10:
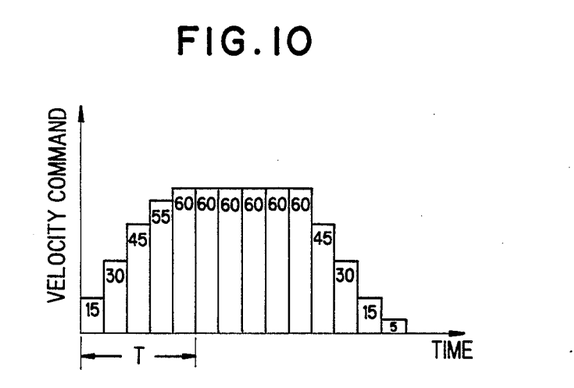

Without modifying the order of sequence of the weights, the set of the weights are next caused to correspond to the next group of unit times shifted by one unit time and an operation is performed in accordance with the formula (3). By this operation, a velocity command value of "30" is determined for the first unit time as shown in FIG. 9(d). In exactly the same manner, another velocity command value of "45" is determined for the second unit time as depicted in FIG. 9(e). Such a processing is repeated, and eventually, the set of the weights are caused to correspond to the unit times as seen at a righthand end part of FIG. 9(b) to determine a thirteenth velocity command value of "5". FIG. 10 shows all the velocity command values, namely, a velocity pattern obtained in the above-described manner. In FIG. 10, T indicates an acceleration time. In the illustrated embodiment, the acceleration time is equal to "5" unit times.

The velocity command values are successively cumulated at the control unit 10, whereby they are converted into X-axis position command values. A current X-axis position (coordinate value) outputted from the position detector 9 is compared with the corresponding one of these X-axis position command values, thereby computing the difference therebetween. The difference thus computed is outputted as a positional deviation from the control unit 10 to the subtractor 4.

The above-described operation is performed when moving commands in the direction of X-axis alone are inputted. A similar operation is also performed when moving commands in the direction of Y-axis are inputted.

In the present embodiment, velocity command values are obtained by adding weights to distributed data respectively and then performing an averaging processing. It is hence possible to simplify a servo control system into such a construction as required to perform computation. In addition, by choosing suitable weights, it is possible to crease a velocity pattern conforming with characteristics of an associated machine, so that impacts and vibrations can be reduced substantially. In general, the friction (stationary friction) when a machine starts moving is greater than the friction (dynamic friction) when the machine stops. In the present embodiment, as is apparent from FIG. 10, a nonsymmetric velocity pattern (i.e., faster at the beginning and slower at the time of stop) conforming with the characteristics of such a machine can be created, so that the above-described advantageous effects can be exhibited fully.

Figure 11:
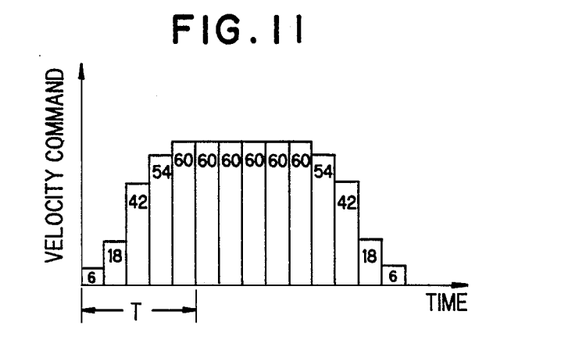

FIG. 11 illustrates a velocity pattern created by a modification of the second embodiment. In this modification, weigths d are set as follows:

$$d_1=1, d_2=2, d_3=4, d_4=2, d_5=1$$

By using such weights as a set, a symmetrical velocity pattern is obtained as shown in FIG. 11. Such a velocity pattern is smoother compared with the velocitY pattern of the preceding embodiment (see FIG. 10), whereby the maximum acceleration and deceleration reductions are greater at acceleration and deceleration. The present modification can exhibit the same advantageous effects as the preceding embodiment.

In the preceding embodiment and its modification, 5 weights were employed by way of example. It should be noted that these embodiment and modification were described to facilitate the understanding. The actual acceleration time T and deceleration time are generally as long as 20 or more unit times. Therefore, the values of weights and the number of weights are not limited to the above examples but can be chosen freely depending on the characteristics of each machine.

I claim:

1. A servo control system having a means for driving a control and a means for commanding target distance and velocity of movement of the control so as to actuate the drive means in accordance with commands from the command means, comprising:

a target position computing means for determining a set of individual target distances of movement for a set of a like number of unit times respectively on the basis of the target distance and velocity of movement; and an averaging means for arranging, before the set of the like number of the unit times, a predetermined number of unit times in each of which the distance of movement is set at zero and averaging target position of movement of a first unit time and those of a desired number of preceding successive unit times to calculate a target position for the first unit time, and then repeating a similar averaging operation successively with respect to each of the remaining unit times in the order of sequence of the remaining unit times until a target position for a last time unit is calculated, whereby actuation of the drive means is controlled based on values obtained by the averaging means.

2. A servo control system having a means for driving a control and a means for commanding target distance and velocity of movement of the control so as to actuate the drive means in accordance with commands from the command means, comprising:

a distribution means for determining a set of distances of movement for a set of like number of unit times respectively on the basis of the target distance and velocity of movement;

a means for adding predetermined numbers of unit times, in each of which the distance of movement is set at zero, before and after the set of the like number of the unit times, respectively;

a means for setting a set of weights for the positions of movement for the like number of unit times, respectively; and an averaging means for successively adding the weights to the positions of movement for the like number of unit times, respectively, and averaging the resulting weighted position of movement of a first unit time and those of a desired number of preceding successive unit times to calculate a target position for the first unit time, and then repeating a similar averaging operation successively with respect to each of the remaining unit times in the order of sequence of the remaining unit times until a target position for a last time unit is calculated, whereby actuation of the drive means is controlled based on values obtained by the averaging means.

* * * * *